United States Patent [19]

Gruenewald

[11] 4,220,258
[45] Sep. 2, 1980

[54] DISPENSING DEVICE

[75] Inventor: Frederick P. Gruenewald, Boston, Mass.

[73] Assignee: Gruenewald Manufacturing Company, Inc., Waltham, Mass.

[21] Appl. No.: 931,176

[22] Filed: Aug. 4, 1978

[51] Int. Cl.[2] ............................................. B67D 5/22
[52] U.S. Cl. ................................. 222/46; 222/402.2; 222/402.25; 222/453
[58] Field of Search ..................... 222/394, 396, 402.2, 222/402.25, 434, 438, 439, 440, 450, 451, 453, 41, 46; 137/627.5, 635

[56] References Cited

U.S. PATENT DOCUMENTS

| | | | |
|---|---|---|---|
| 2,747,775 | 5/1956 | Pritchard | 222/453 |
| 2,856,103 | 10/1958 | Ward | 222/402.2 |
| 3,019,947 | 2/1962 | Gorman | 222/438 |
| 3,064,696 | 11/1962 | Gruenwald | 222/402.25 |
| 3,180,536 | 4/1965 | Meshberg | 222/402.2 |
| 3,221,946 | 12/1965 | Riley | 222/402.2 |
| 3,260,418 | 7/1966 | Clouzeau et al. | 222/41 |

*Primary Examiner*—H. Grant Skaggs
*Attorney, Agent, or Firm*—James H. Grover

[57] ABSTRACT

A reuseable pressurized container and metering device for dispensing predetermined amounts of fluid. The device includes a metering chamber having two apertures with a central stem disposed therein. Two sealing rings are mounted on the stem, each adjacent an aperture, and are adapted to allow fluid to be forced into a reservoir through the metering device but are arranged to prevent the flow of fluids out of the metering device except when the stem is displaced by pressing a button attached at one end. One of the rings on the stem seals the metering chamber from an external charging and discharging passage and the other ring simultaneously seals the metering chamber from the reservoir while the fluids contained within the metering chamber are being discharged, thereby limiting the quantity of fluid which can be dispensed. Following the discharge of all the fluids in the metering chamber, the button is released and one ring seals the metering chamber from the discharge conduit and the other is released to replace the metering chamber into communication with the reservoir. Additionally the stem can be set so as to provide for a continuous flow of fluids from the reservoir through the metering chamber and out of the discharge passage. A plurality of telescoping inserts can be disposed within the metering chamber so as to reduce the volume, thereby reducing the quantity of fluid that can enter and thereby limit further the quantity of fluid which can be dispensed.

14 Claims, 2 Drawing Figures

DISPENSING DEVICE

BACKGROUND OF THE INVENTION

This invention relates to dispensing of fluids from reuseable pressurized containers and particularly to a metering device for dispensing predetermined quantities of fluids from such containers through a passage in which a high pressure gas can be fed into the container to charge it and the pressurized contents of the container are also dispensed therefrom. The dispenser has a continuous flow mode in which the metering aspects can be bypassed and the flow is controlled only by the operator.

DESCRIPTION OF THE PRIOR ART

Reuseable pressurized containers are known to the art. For example, the U.S. Patent to Gruenewald, U.S. Pat. No. 3,064,696 discloses a container that can both charge and discharge fluids through the same passage. The quantity of fluid dispensed, however is, not controlled other than by a push button which opens and closes the discharge passage. On the other hand, metering devices associated with pressurized containers are also known to the art. For example the U.S. patent to Green, U.S. Pat. No. 3,547,317 discloses a metering device housed in a pressurized container to deliver predetermined quantities of fluid from a reservoir. Changing from a metered to a continuous flow of fluid from the reservoir appears to be awkward and difficult because the conversion requires the removal of an entire piece of the device and substituting another in its place. Such removal and substitution requires storage of the piece not being used and possible loss.

SUMMARY OF THE INVENTION

According to the present invention, I have discovered a reuseable dispensing device for delivering fluids under pressure which can be easily changed without discharging from continuous flow to metered portions and when in the metering mode, can dispense different predetermined volumes of fluid. The device includes a metering chamber which is adapted to contain the fluids. Two apertures are disposed in the metering chamber, one for dispensing fluid and the other for receiving fluids from a reservoir. A stem extends through the first aperture and cooperates with the second aperture. An O-ring seal is arranged on the stem to close the first aperture and prevent fluids from leaving the chamber unless the stem is depressed. A second O-ring is also disposed upon the stem, spaced from the first O-ring and arranged also to be spaced from the second aperture when the first aperture is closed by the first O-ring, thereby preventing the flow of fluids from the reservoir into the metering chamber while fluids are being dispensed from the metering chamber through the first aperture to the discharge passage. Preferably, the stem is arranged relative to the first and second apertures so that when in the continuous dispensing mode, the second O-ring will not be seated in the second aperture thereby providing for a continuous passage from the reservoir through the second aperture, into the metering chamber and out the first aperture to the discharge passage. In a preferred embodiment, the stem is partially removed beneath the first O-ring so as to provide only an upper support and prevent the egress of fluids from the metering chamber. Support is not provided beneath the O-ring so that if pressure is exerted from an external supply which is greater than the pressure in the metering chamber, the fluid from the external supply can be injected into the metering chamber and then into the reservoir by displacing the O-ring from its normal location around the shaft.

Quite advantageously, the present dispenser is not limited in its use to a single type of reservoir. For example, the dispenser can be disposed wholly within a pressurized container than serves as a reservoir for the fluids or alternatively, it can be used as a hand-held unit that is connected by a hose to a remote fluid supply tank.

The meterinf device of the present invention has particular usefulness in dispensing whipped topping in soda fountains. The invention enables the operator of the facility to regulate the quality of the topping being dispensed and also control the quantity. Charging and discharging the reservoir is quite easy and the cost of the whipped topping is reduced because throw-away containers and valves are eliminated. The system is waste free because the topping is not left over since the dispenser empties completely and the operator can add propellent whenever required. Any residual unwhipped topping in the reservoir can be readily recycled or transferred to another container for subsequent use.

DRAWINGS

DESCRIPTION OF THE PREFERRED EMBODIMENTS

Figure 1:
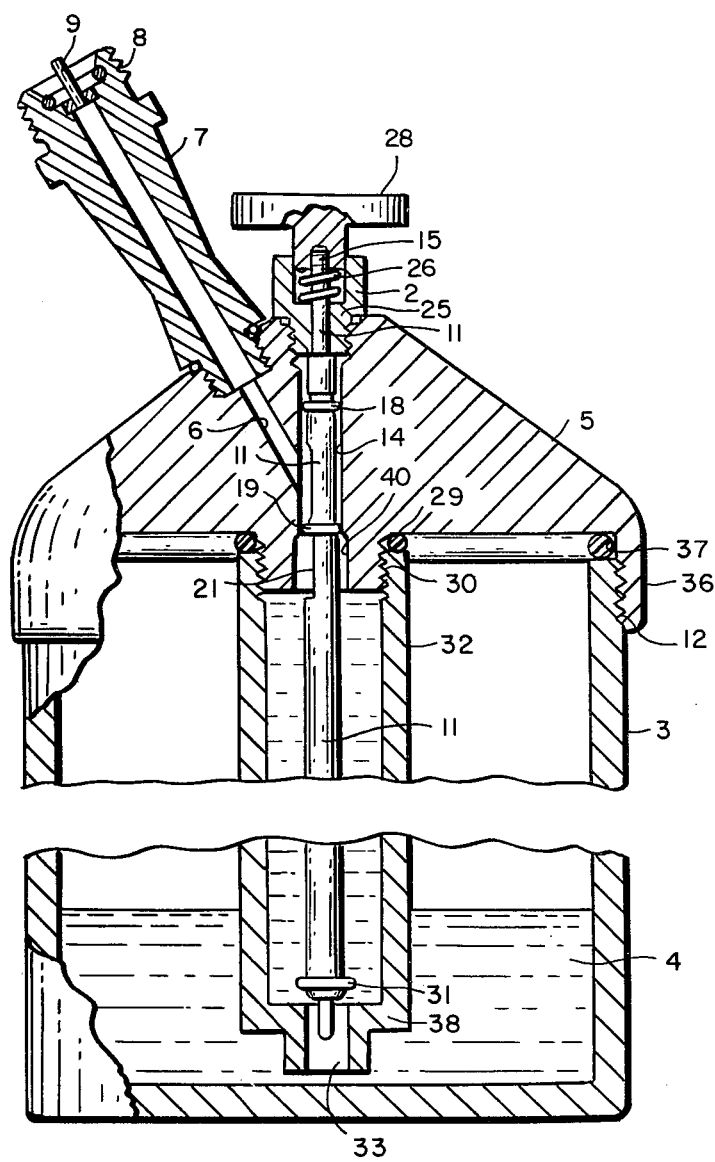
FIG. 1 is a cross sectional view of a dispenser of the present invention utilizing the metering device.

Referring now to FIG. 1, the dispenser of the present invention includes a chamber 3 which contains a reservoir of fluids 4. A cap 5 is secured to chamber 3 by screw threads 12 which are disposed within an overhanging lip 36. An O-ring seal 37 is disposed between the mouth of chamber 3 and the interior of cap 5 to prevent leakage of the fluids. A central passage 14 is disposed within cap 5 and arranged to house stem 11 that is axially movable therein. A bushing 25 is threaded into the top of cap 5 and slidably receives one end of stem 11. Stem 11 extends through the bushing 25 and terminates in a thread 15 which is attached to a button 28. Button 28 is partially housed within a sleeve 2 which forms a portion of bushing 25. A spring 26 is disposed within the sleeve 2 and urges button 28 away from bushing 25 thereby normally forcing stem 11 upwardly. A seal between the stem 11 and the atmosphere is maintained through an O-ring 18 that is disposed about stem 11 and bears against the sides of central passage 14 within cap 5.

An inlet and discharge passage 6 is also disposed within cap 5 and communicates with central passage 14 that houses stem 11. A charging and discharging tube 7 is fitted into the exterior end of passage 6 and provides a means for discharging fluids from the dispensing device and also for filling the device with propellent when it is empty. Preferably, the diameter of stem 11 is reduced at the juncture point between discharge passage 6 and central passage 14 so as to provide for easy flow of materials around stem 11.

The metering device of the present invention is disposed in communication with central passage 14 and includes a cylinder 32 with a base 38 integrally attached thereto. An aperture 33 is disposed at the lower end of the metering device and within base 38. Cylinder 32 is attached to a cap 5 by means of threads 30 and an O-ring seal 29 is disposed between the end of cylinder 32 and cap 5 to prevent the flow of fluids through the attachment. An aperture 40 is disposed within cap 5 and stem 11 is centrally disposed therein.

An O-ring 19 is mounted on stem 11, and bears against central passage 14 to prevent the egress of fluids from the metering chamber into passage 14 or 6. A small portion 21 of stem 11 is cut away immediately below O-ring 19 so that O-ring 19 is displaceable and opens when fluids are injected into discharge passage 6 from the outside but is supported on the side nearest to passage 6 to prevent egress of fluids from within the metering chamber.

When button 28 is pressed, O-ring 19 will be depressed within aperture 40 and will allow fluids to pass by and discharge through passage 6. The diameter of aperture 40 is slightly greater than the external diameter of O-ring 19 thereby allowing such passage. A second O-ring 31 is disposed at the other end of stem 11 and is arranged to close aperture 33 when button 28 is pressed so that fluids cannot flow from reservoir 4 while O-ring 19 is displaced from closing central passage 14. With this arrangement, only fluids contained within the metering chamber can be dispensed through discharge passage 6. When the metering chamber has been emptied fluids will stop flowing from discharge passage 6 and button 28 can be released thereby unseating O-ring 31 and opening aperture 33 to allow fluids from reservoir 4 to enter the metering chamber. Their egress from the metering chamber, however, is prevented by O-ring 19 which closes central passage 14.

The preferred method of filling the dispensing device of this embodiment of the present invention is to unscrew cap 5 from chamber 3 and add the desired amount of liquid to form the reservoir 4. The cap 5 is then replaced on chamber 3 and a pressure line is attached to nipple 9 and tube 7 by means of threads 8 that are disposed at the end. The gas, under pressure, is forced through discharge passage 6, by O-ring 19 and into the metering chamber. Since the O-ring seal between the metering chamber and the reservoir is open, the gas will pass into the metering chamber but cannot escape since the O-ring 19 is normally seated so as to close aperture 40. In operation, the gas will force the liquid in reservoir 4 into the metering chamber to fill it. Then after depressing the button 28, stem 11 will carry O-ring 31 to seat it in aperture 33 and prevent the passage of liquid from reservoir 4 into the metering chamber while liquid that is already within the metering chamber is propelled through discharge passage 6 since O-ring 19 will be unseated.

In a second mode of operation for the dispenser of FIG. 1, bushing 25 can be turned thereby raising both O-ring 31 which had sealed the aperture 33 and also raising O-ring 19 which seals aperture 40. As stated, the diameter of aperture 40 in cap 5 is slightly greater then the diameter of O-ring 19 so that when O-ring 19 is depressed into it, fluid will pass by into passages 14 and 6. When the button 28 is not depressed, O-ring 19 will form a seal with central passage 14 to prevent the egress of fluid.

Figure 2:
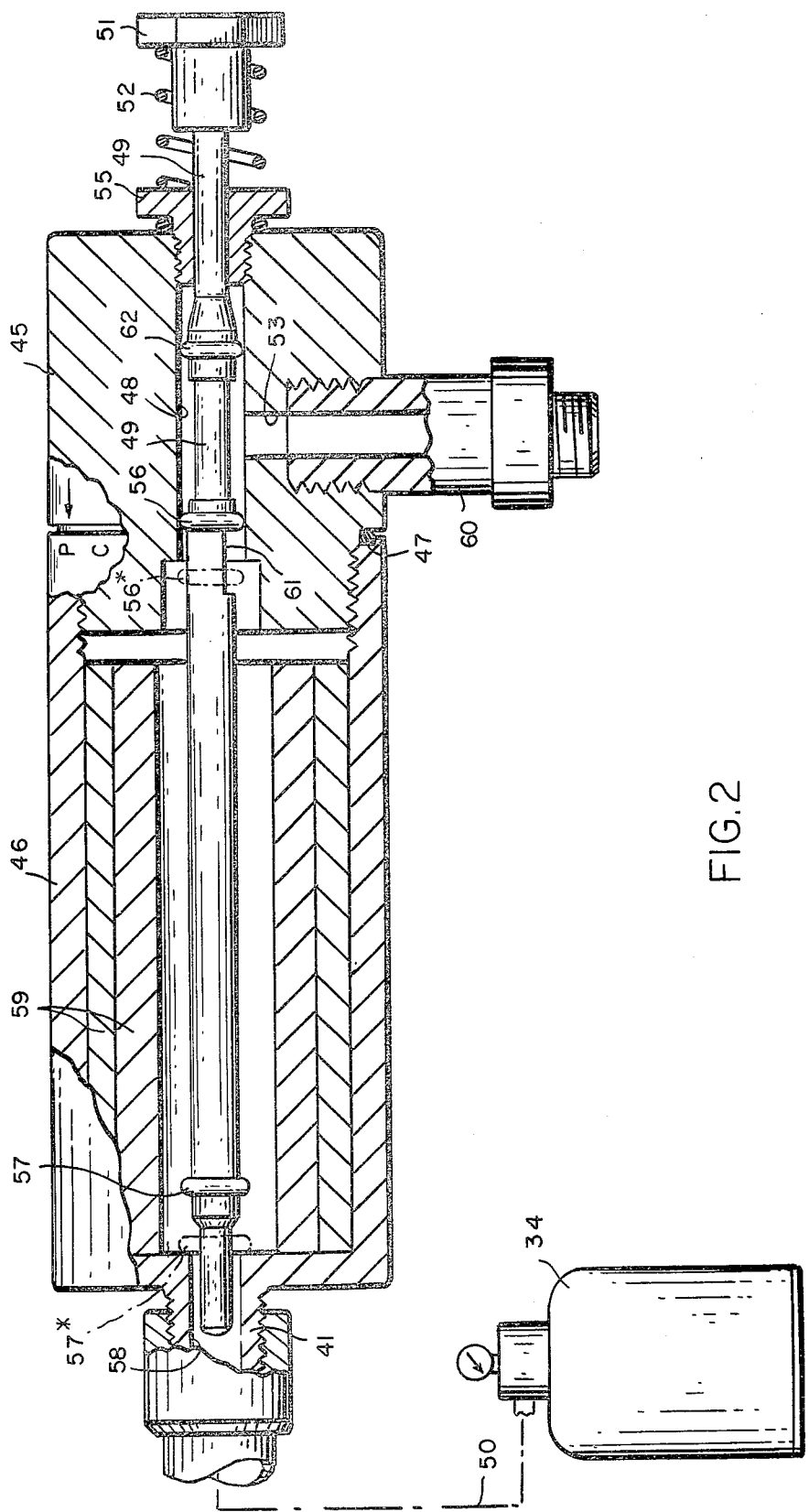
FIG. 2 is a cross sectional view of the metering device of the present invention connected to a centralized source of fluids through a hose.

Turning now to FIG. 2, the construction of the dispenser is similar to the embodiment described with reference to FIG. 1 except that the metering device is adapted to be held in the hand and connected by an armored hose 50 to a remote tank 34 containing a reservoir of fluids (both topping and propellent gas). The armored hose 50 is connected to a nipple 41 which is similar to the second aperture 33 mentioned to reference to reference to FIG. 1. While only one dispenser is shown in the second embodiment, it is possible to use a system of a multiplicity of dispensers connected to a single remote tank 34, if desired.

The hand held dispenser includes a cap 45 which is threaded into a cylinder 46 that contains a metering arrangement that is similar to that which was described previously. An O-ring seal 47 is disposed between the mouth of cylinder 46 and a shoulder on cap 45 to prevent leakage. A central passage 48 is disposed within cover 45 and houses stem 49 that is axially supported by a bushing 55. A button 51 is disposed upon the external end of stem 49 and is urged outwardly by spring 52 which biases against bushing 55. A discharge passage 53 is disposed in communication with central passage 48 to provide for the flow of fluids from the dispenser and O-ring 62 is disposed between the discharge passage 53 and bushing 55 to seal the dispenser from the atmosphere and prevent leakage.

A second O-ring 56 is disposed about stem 49 below discharge passage 53 and seals cylinder 46 to prevent the contents from emerging from discharge passage 53 unless button 51 is depressed. Central passage 48 is enlarged below the sealing position O-ring 56 so that when button 51 is depressed, O-ring 56 will slide into the enlargement and allow the flow of fluids from cylinder 46 to discharge through passage 53.

As in the case of the embodiment described in FIG. 1, O-ring 57 is disposed such that aperture 58 is open while button 51 is not depressed. When button 51 is depressed, O-ring 57 will seal aperture 58 and prevent the flow of fluids from hose 50 until button 51 is released, usually when the contents of cylinder 46 are fully emptied through discharge passage 53. The disposition of the seals 56 and 57 are shown in phantom lines as 56* and 57* to illustrate their location when button 51 is pressed.

A plurality of sleeve-like, telescoping inserts 59 can be inserted within cylinder 46 to reduce the volume of fluids which can enter. Incorporation of these inserts 59 is accomplished by removing cover 45 from cylinder 46 and sliding them into place. If a continuous flow of fluids is desired, without relying upon the metering aspects of this invention, cap 45 can be turned relative to cylinder 46, thereby carrying stem 49 and withdrawing O-ring 57 from aperture 58 and allowing the fluids from hose 50 to pass into cylinder 46. Continuous discharge of these fluids from passage 53 is accomplished by depressing button 51 which will force O-ring seal 56 out of engagement with central passage 48. Conveniently, indexing marks are disposed on cylinder 46 (P & C) and coincide with indicia on cap 45 (←) to show if the dispenser is in the continuous or portioned mode. Such marks are preferably displaced 90° from each other on the cylinder to provide for a one quarter turn of the cap to change modes.

A tube 60 can be threaded into passage 53 to provide for directional discharge of the fluids from cylinder 46. A conventional nozzle can, in turn, be threaded to the end of tube 60 for the discharge of these fluids. The nozzle can be removed, when desired, to allow for attachment of a source of pressurized gas and/or product that can be directed into tank 34 in the same manner as was discussed with reference to FIG. 1, that is past the one-way seal formed by O-ring 56 that is disposed upon stem 49 with support provided only on one side and a cut-away portion 61 disposed on the other side. Of course, pre-pressurized containers of fluids can be used with the present invention and merely disconnected when empty.

It is apparent that modifications and changes may be made within the spirit and scope of the present invention. It is my intention, however, only to be limited by the scope of the appended claims.

I claim:

1. A dispensing device for delivering fluids under pressure comprising:
   a metering chamber having an exit aperture for dispensing fluids and an inlet aperture for receiving pressurized fluids from a reservoir; and
   a valve stem seated in a closure means for the metering chamber and extending through the exit aperture to the inlet aperture, said stem being moveable from a closed position to a dispensing position and including a first means sealing the exit aperture in a closed position and a second sealing means normally disposed to open the inlet aperture with the stem in the closed position and to seal the inlet aperture with the stem in the dispensing position, whereby pressurized fluids fill the metering chamber while the stem is in the closed position and a quantity of fluid metered by the chamber is delivered from the chamber with the stem in the dispensing position;
   said metering chamber further including said closure means being moveably attached to the chamber for external adjustment of the stem from the outside of the device to an alternative position in which the second sealing means is disposed to open the exit aperture with the stem in the dispensing position so as to allow an unmetered delivery of fluid and the movement of said closure means to said alternative position being such that the passage of pressurized fluid to the metering chamber is uninterrupted by said external adjustment of the stem.

2. The device according to claim 1 wherein the closure means is threaded on the chamber to rotate between two alternative positions for selective delivery of metered and unmetered quantities of fluid.

3. The device according to claim 1 or 2 wherein index marks on said closure means and chamber denote the alternative positions.

4. A dispensing device for delivering fluids under pressure, said device comprising:
   a metering chamber adapted to contain said fluids;
   a first aperture leading to a discharge passage of said dispenser for dispensing fluids and a second aperture therein for receiving fluids from a reservoir;
   a stem extending through said first aperture and arranged to cooperate with said second aperture;
   a first sealing means cooperatively associated with the first aperture and arranged on said stem to seal said first aperture to prevent the egress of fluids from the chamber;
   a second sealing means disposed on said stem, spaced from said first sealing means and arranged to be spaced from said second aperture when said first aperture is closed by said first sealing means;
   the location of said stem being changeable from the outside of said device so as to displace said second sealing means without unsealing said first aperture thereby to allow the continuous flow of fluid through the aperture and thence into the metering chamber and the changing of location of said stem from the exterior of the device being such that the passage of pressurized fluid to the metering chamber is uninterrupted by said change.

5. The dispensing device according to claim 4 wherein a portion of the stem is removed beneath said first sealing means so as to provide an upper support for said sealing means to prevent the egress of fluids from said chamber but to provide no support below the sealing means against pressure which is greater than the pressure in said metering chamber whereby fluid can be injected from an external supply past the unsupported portion of said sealing means and into said metering chamber.

6. The dispensing device according to claim 7 or 5 wherein a charging and discharging passage is disposed in communication with said first aperture and said first sealing means.

7. The dispensing device according to claim 6 further including a canister constituting said reservoir which is disposed about said metering chamber and a cap is disposed on said canister, said charging and discharging passage being disposed in said cap in communication with a passage for holding said stem.

8. The dispensing device according to claim 6 further including an auxiliary tank constituting said reservoir and means for connecting said tank to said second aperture of said metering chamber.

9. The dispensing device according to claim 4 wherein the sealing means are elastic O-rings and said first aperture includes a cylindrical recess which is arranged to receive one of said O-rings.

10. The dispensing device according to claim 4 wherein at least one insert is disposed in said metering chamber to reduce the volume of said metering chamber and thereby reducing the quantity of fluid which can be dispensed through said first aperture.

11. The dispensing device according to claim 10 wherein the insert is a cylindrical sleeve adapted to fit against the sides of said metering chamber.

12. The dispensing device according to claim 10 where there are two inserts, said inserts being formed as a plurality of telescoping sleeves.

13. The dispensing device according to claim 4 wherein the metering chamber is formed of a cap, a cylinder and a base, said second aperture being disposed in said base, said base being intergal with said cylinder and said cap being secured to said cylinder by threads.

14. The device according to claim 4 wherein the flow of fluids is controlled by pressing a button disposed on said stem at a location past said first aperture thereby simultaneously displacing said first sealing means and said second sealing means.

* * * * *

UNITED STATES PATENT AND TRADEMARK OFFICE
CERTIFICATE OF CORRECTION

PATENT NO. : 4,220,258
DATED : September 2, 1980
INVENTOR(S) : Frederick P. Gruenewald It is certified that error appears in the above-identified patent and that said Letters Patent are hereby corrected as shown below:

In claim 6, line 1, between the word "claim" and the word "or", delete "7" and insert -- 4 --.

Signed and Sealed this

Fourteenth Day of July 1981

[SEAL]

Attest:

GERALD J. MOSSINGHOFF

Attesting Officer     Commissioner of Patents and Trademarks